Dec. 7, 1926.

F. A. KOLSTER

RADIO APPARATUS

Filed Nov. 26, 1920

1,609,366

INVENTOR.
Frederick A. Kolster
BY Cornelius D. Ehret
his ATTORNEY.

Patented Dec. 7, 1926.

1,609,165

UNITED STATES PATENT OFFICE.

FREDERICK A. KOLSTER, OF WASHINGTON, DISTRICT OF COLUMBIA, ASSIGNOR TO FEDERAL TELEGRAPH COMPANY, OF SAN FRANCISCO, CALIFORNIA, A CORPORATION OF CALIFORNIA.

RADIO APPARATUS.

Application filed November 26, 1920. Serial No. 436,503.

My invention relates to apparatus for transmitting or receiving electro-radiant energy for the transmission of intelligence, as by telegraphy or telephony, or other signaling, for unilateral direction finding or unilateral transmission, and for interference prevention.

For an illustration of some of the various forms my apparatus may take, reference is to be had to the accompanying drawings, in which.

Figure 1:
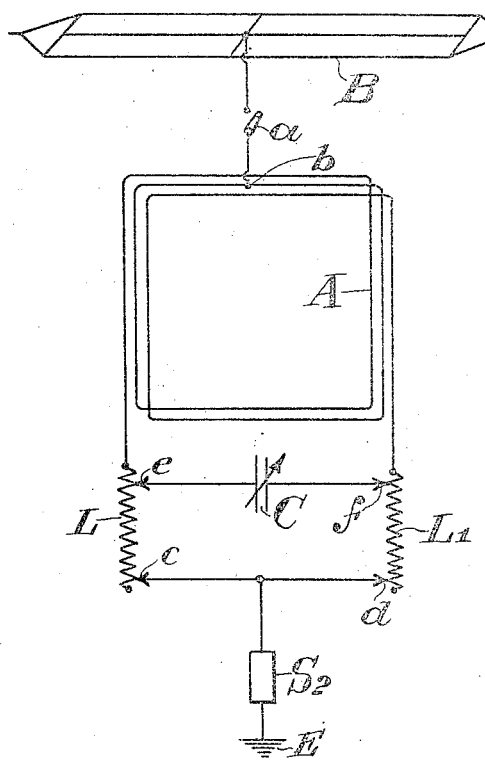
Fig. 1 is a diagrammatic view of transmitting apparatus embodying my invention.

In Fig. 1 the rotatable coil A, of the character and for purposes described in my prior Letters Patent No. 1,447,155, has at its ends the inductances L and L¹. A variable tuning condenser C has its terminals connected to variable points upon these inductances. A connection to earth or counter-capacity E is made from a point between contacts adjustable along said inductances. In said connection to earth or counter-capacity is a source $S^2$ of oscillations of any suitable type. Thus, the source $S^2$ may be a spark gap or an arc directly in said earth connection, or damped or undamped oscillations may be impressed by a coupling upon said connection to earth or counter-capacity. The closed circuit comprising the coil A and condenser C is attuned to the frequency of oscillations from the source $S^2$. The antenna path or paths is or are also attuned to the same frequency. By varying the inductance adjustments $c$ and $d$, the antenna structure is attuned to said frequency. Varying the adjustments $e$ and $f$ upsets the symmetry or balance of the closed circuit with respect to the connection to earth or counter-capacity, and therefore unbalances, to any extent desired, the closed circuit with respect to the antenna path or paths. Moving the contact $e$ upward and the contact $f$ downward to like extents does not affect the resonance or tuning of the closed circuit, but effects an unbalancing of the closed circuit with respect to the antenna path or paths, whereby there occurs a transfer of energy from the antenna path or paths to the closed circuit, thereby producing a unidirectional or unilateral effect as described in said Letters Patent. Reversing the direction of adjustment of the contacts $e$ and $f$, that is, moving the contact $e$ downwardly and $f$ upwardly from a position corresponding with balance or symmetry of the closed circuit with respect to the antenna path or paths, the unbalance is in opposite sense, and maximum energy will now be radiated in a direction opposite that for the previously assumed adjustment. Thus, by changing the sense of unbalancing the effect is the equivalent of rotating the coil A through 180 degrees. If desired, the contacts $e$ and $f$ may be so coupled mechanically or otherwise that they may be operated in unison, but in opposite senses as described, for effecting unbalance, without changing the tuning or resonance of the closed circuit.

The arrangement described is reversible in that transfer of energy may take place either from the antenna structure to the closed circuit, or vice versa.

Additional antenna structure or capacity area, as B, may be connected to the system, by closing the switch $a$, whereupon the additional antenna or capacity area B becomes connected to a mid point $b$ of the coil A.

It will be understood that the arrangement is reversible in that the additional antenna or capacity area B may be connected at the point between the contacts $c$ and $d$ where the earth connection is shown, in which case the earth connection including the source $S^2$ would then be connected to the point $b$.

Figure 2:
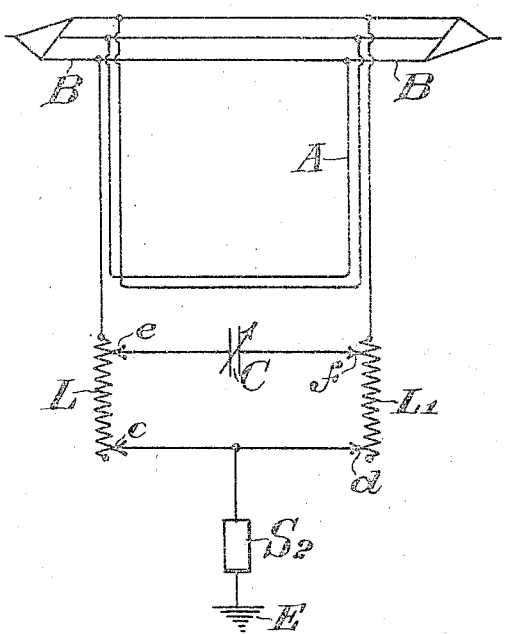
Figs. 2 and 3 are diagrammatic views of other forms of apparatus embodying my invention.

Referring to Fig. 2, the arrangement is similar to that indicated in Fig. 1, except that in this case a part of each of a plurality of wires or conductors forming part of the antenna or capacity area E constitutes a part of each of one of a plurality of turns or convolutions of the coil A, which may be rotatable about a vertical axis, the antenna or capacity area B rotating therewith or, if stationary, the coil A having flexible connections to the wires of the antenna B to allow rotation. In this case again the unilateral or unidirectional effects are obtainable.

The additional capacity area effected by the extensions or capacity wings B on the turns of the inductance A serves to impart to both the closed path and the open or antenna path greater capacity, located far from the earth or countercapacity E. In other words, the structure described is a means for adding to the total capacity of both the antenna and closed paths and to cause the center of capacity of the entire system to be further removed from the earth or countercapacity E than if the structure B were not added or present. In other words, the additional capacity area B in the form indicated in Fig. 2 has in general the same effect as the inclusion of the extra capacity B in said Letters Patent; this structure in effect artificially imparts electrical height to the system above the countercapacity or earth E.

Figure 3:
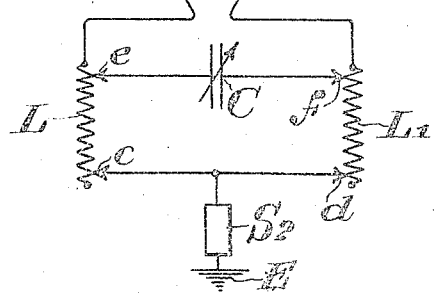

In Fig. 3 the coil A is triangular in shape with an apex at the bottom, the side and top wires of the coil having, if desired, substantial length so that A is at once a coil and an extended antenna or capacity area.

Figure 4:
Fig. 4 is a side elevational view of a part of Fig. 3.

As will be noted, particularly from Fig. 4, which is a side view of the structure shown in Fig. 3, the wires or convolutions are widely separated at the top of the structure. The wide separation of the wires, particularly at the top of the structure, and the employment of the greater part of the wire or length of the convolutions at the top of the structure away from the ground, both contribute in keeping the capacity area of the structure or coil A high above the ground, that is, the center of capacity of the system, as in Fig. 1 is near the top, that is, far from the ground or counter-capacity E.

While in Figs. 1 to 3 inclusive the high frequency energy is impressed upon the antenna path or paths and some of it transferred to the closed circuit due to unbalance of the latter with respect to the antenna path or paths, it will be understood that the energy may be impressed upon the closed circuit, and due to dissymmetry, some of it transferred to the antenna path or paths.

Or, as in Fig. 7 of said Letters Patent, high frequency energy may be impressed simultaneously upon the closed circuit and the antenna path or paths of Figs. 1 to 3 inclusive.

It will further be understood that arrangements like those of Figs. 1 to 3 inclusive may be used for unilateral reception or unilateral direction finding, interference prevention, etc., by associating with the closed circuit and antenna path or paths suitable receiving or detecting apparatus, such, for example, as that described in my aforesaid Letters Patent No. 1,447,165. Thus, in each of said figures the receiving circuits may be connected to the opposite terminals of the condenser C; or they may be coupled to the antenna path or paths at S². Or the receiving circuits may be associated simultaneously with both the closed circuit and antenna path or paths.

What I claim is:

1. Radio apparatus comprising a closed circuit including an inductance, and a capacity area comprising a conductor a part of which is a part of a convolution of said inductance.

2. Radio apparatus comprising a capacity area having a plurality of conductors, a closed circuit including an inductance of a plurality of turns, a part of each of a plurality of said conductors of said capacity area constituting a part of each of a plurality of turns of said inductance.

3. Radio apparatus comprising a closed circuit including an inductance, and a capacity area comprising a conductor a part of which is a part of a convolution of said inductance, and a connection from said closed circuit to a counter-capacity.

4. Radio apparatus comprising a closed circuit including an inductance, and a capacity area comprising a conductor a part of which is a part of a convolution of said inductance, a connection from said closed circuit to a counter-capacity, and means for determining the degree of symmetry of said closed circuit with respect to said last named connection.

5. Radio apparatus comprising a capacity area, having a plurality of conductors, a closed circuit including an inductance of a plurality of turns, a part of each of a plurality of said conductors of said capacity area constituting a part of each of a plurality of turns of said inductance, and a connection from said closed circuit to a counter-capacity.

6. Radio apparatus comprising a capacity area having a plurality of conductors, a closed circuit including an inductance of a plurality of turns, a part of each of a plurality of said conductors of said capacity area constituting a part of each of a plurality of turns of said inductance, a connection from said closed circuit to a counter-capacity, and means for determining the degree of symmetry of said closed circuit with respect to said last named connection.

7. Transmitting apparatus comprising a plurality of radiators, one of which is an antenna structure and another a closed circuit forming a part of said structure, means for determining the degree of symmetry of said closed circuit with respect to said antenna structure comprising inductances in series with each other in said closed circuit, at least one of said inductances being variable, a connection from a point between said inductances to a capacity area or counter-capacity, and means for setting up oscillations in said antenna structure and said closed circuit.

8. Transmitting apparatus comprising a plurality of radiators, one of which is an antenna structure and another a closed circuit forming a part of said structure, means for determining the degree of symmetry of said closed circuit with respect to said antenna structure comprising inductances in series with each other in said closed circuit, at least one of said inductances being variable, a connection from a point between said inductances to a capacity area or counter-capacity, and means for impressing high frequency oscillations upon said antenna structure and through said inductances upon said closed circuit.

9. Transmitting apparatus comprising a plurality of radiators, one of which is an antenna structure and another a closed circuit forming a part of said structure, means for determining the degree of symmetry of said closed circuit with respect to said antenna structure comprising inductances in series with each other in said closed circuit, at least one of said inductances being variable, a connection from a point between said inductances to a capacity or counter-capacity, a condenser whose terminals are connected, respectively, to said inductances at points distant from said connection, and means for setting up oscillations in said antenna structure and said closed circuit.

10. Transmitting apparatus comprising a plurality of radiators, one of which is an antenna structure and another a closed circuit forming a part of said structure, a radiating inductance in said closed circuit, a condenser in series with said inductance in said closed circuit, inductances in series with each other and in parallel to said condenser, a connection from a point between said inductances to a capacity area or counter-capacity, and means for effecting oscillations in said antenna structure and said closed circuit.

11. Radio apparatus comprising a closed circuit including an inductance coil co-acting directly with the natural media, a condenser for tuning said closed circuit, inductances connected to the ends of said coil, a conductor connecting the ends of said inductances, and a connection from said conductor to earth or counter-capacity.

12. Radio apparatus comprising a closed circuit including an inductance coil co-acting directly with the natural media, a condenser for tuning said closed circuit, inductances connected to the ends of said coil, connections from the terminals of said condenser to said inductances, a conductor connecting said inductances at points thereon non-coincident with the points to which the terminals of said condenser are connected, and a connection from said conductor to earth or counter-capacity.

13. Radio apparatus comprising a closed circuit including an inductance coil co-acting directly with the natural media, a condenser for tuning said closed circuit, inductances connected to the ends of said coil, variable connections from the terminals of said condenser to said inductances, and variable connections from said inductances to earth or counter-capacity.

In testimony whereof I have hereunto affixed my signature this 26th day of November, 1920.

FREDERICK A. KOLSTER.